US011906929B2

(12) United States Patent
Zaugg et al.

(10) Patent No.: US 11,906,929 B2
(45) Date of Patent: Feb. 20, 2024

(54) DETENT ESCAPEMENT FOR A TIMEPIECE

(71) Applicant: Montres Breguet S.A., L'Abbaye (CH)

(72) Inventors: Alain Zaugg, Le Sentier (CH); Jérôme Macé, Le Pont (CH); Benoît Légeret, Ecublens (CH)

(73) Assignee: Montres Breguet S.A., L'Abbaye (CH)

( * ) Notice: Subject to any disclaimer, the term of this patent is extended or adjusted under 35 U.S.C. 154(b) by 440 days.

(21) Appl. No.: 17/202,662

(22) Filed: Mar. 16, 2021

(65) Prior Publication Data

US 2021/0349424 A1 Nov. 11, 2021

(30) Foreign Application Priority Data

May 5, 2020 (EP) .................................... 20173027

(51) Int. Cl.
*G04B 15/06* (2006.01)
*G04B 15/14* (2006.01)

(52) U.S. Cl.
CPC ............ *G04B 15/06* (2013.01); *G04B 15/14* (2013.01)

(58) Field of Classification Search
CPC ................................ G04B 15/06; G04B 15/14
See application file for complete search history.

(56) References Cited

U.S. PATENT DOCUMENTS

2005/0122847 A1* 6/2005 Hayek .................... G04B 15/06 368/127
2006/0221774 A1* 10/2006 Conus .................... G04B 15/06 368/127

(Continued)

FOREIGN PATENT DOCUMENTS

CN 1841240 A 10/2006
CN 101750953 A 6/2010

(Continued)

OTHER PUBLICATIONS

European Search Report dated Oct. 22, 2020 in European Application 20173027.2 filed May 5, 2020 (with English Translation of Categories of Cited Documents), 3 pages.

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A detent escapement includes an escape wheel with teeth regularly spaced along a perimeter and a balance having an impulse pallet and receiving driving impulses via the teeth, the balance performing an alternation during which it receives a driving impulse and an alternation without a driving impulse, the detent escapement also including a hook pivotally mounted on the balance and held bearing by an elastic member against an abutment, the detent escapement including a pivotable detent which includes a first arm which collaborates with the escape wheel to block the latter before the start of the driving impulse, as well as a second arm to allow the escape wheel to disengage from its engagement with the first arm at the start of the driving impulse, and which limits the pivoting of this detent to only part of the oscillation of the balance, the detent being configured to again block the escape wheel after the latter has finished providing the driving impulse to the impulse pallet of the balance.

15 Claims, 10 Drawing Sheets

(56) References Cited

U.S. PATENT DOCUMENTS

| | | | | |
|---|---|---|---|---|
| 2008/0219103 | A1 | 9/2008 | Baumberger et al. | |
| 2010/0149926 | A1* | 6/2010 | Colpo | G04B 15/06 368/127 |
| 2010/0214881 | A1 | 8/2010 | Chiuve et al. | |
| 2012/0300596 | A1* | 11/2012 | Koda | G04B 15/06 368/131 |

FOREIGN PATENT DOCUMENTS

| | | | |
|---|---|---|---|
| CN | 102870049 | A | 1/2013 |
| EP | 1 538 490 | A1 | 6/2005 |
| EP | 1 708 047 | A1 | 10/2006 |
| EP | 2 224 292 | A2 | 9/2010 |
| EP | 3 121 660 | A1 | 1/2017 |

OTHER PUBLICATIONS

Combined Chinese Office Action and Search Report dated Apr. 14, 2022 in Chinese Patent Application No. 202110488851.5 (with English translation of Category of Cited Documents), 7 pages.

* cited by examiner

DETENT ESCAPEMENT FOR A TIMEPIECE

CROSS-REFERENCE TO RELATED APPLICATION

This application claims priority to European Patent Application No. 20173027.2 filed on May 5, 2020, the entire disclosure of which is hereby incorporated herein by reference.

TECHNICAL FIELD OF THE INVENTION

The object of the present invention is a detent escapement for a timepiece, in particular for a wristwatch.

TECHNOLOGICAL BACKGROUND OF THE INVENTION

An escapement is a mechanism which is placed between the escape wheel and the regulating member of most time instruments. Produced by a barrel spring, the driving force is transmitted to the escape wheel which in turn communicates this driving force to the escapement whose function is to maintain the oscillations of a regulating member called balance.

The detent escapement made its appearance during the 18th century, when maritime nations launched competitions for the construction of the most precise time instrument possible, allowing the most reliable determination of the geographical position at sea. Which is why even today, detent escapements are mainly found in marine chronometers.

Expensive and delicate, detent escapements are escapements called coup perdu escapements. In other words, the detent escapements only give the balance one impulse with each oscillation, so that these oscillations always comprise an alternation without impulse also known as “coup perdu”.

A first embodiment of a detent escapement is illustrated in FIG. 1 appended to the present patent application. Designated as a whole by the general reference numeral 1, this detent escapement comprises an escape wheel 2 whose teeth 4 rest on a stone 6. This stone 6 is carried by a body 8 of a detent 10 which equips a timepiece (not shown).

As can be seen in the drawing, the body 8 of the detent 10 is terminated at a first end by a beak 12, and is connected at a second end to a frame 14 of the timepiece by a leaf spring 16. Moreover, the body 8 of the detent 10 in turn carries a detent spring 18 bearing against the beak 12. This beak 12 against which bears the detent spring 18 is located in the field of action of a disengagement pallet 20 carried by a plate 22 of a balance 24.

When the balance 24 and its plate 22 rotate in the counter-clockwise direction, driving with them the disengagement pallet 20, this disengagement pallet 20 in turn drives the detent spring 18 and therefore the body 8 of the detent 10, which has the effect of releasing that of the teeth 4 of the escape wheel 2 which is engaged with the stone 6 from its engagement with this stone 6. Thus, at each alternation of the balance 24 in the counter-clockwise direction, the escape wheel 2 is released.

When the tooth 4 of the escape wheel 2 which rests on the stone 6 leaves the latter, another tooth 4 of the escape wheel 2, acting on an impulse pallet 26 carried by the plate 22 of the balance 24, gives an impulse to the balance 24.

Conversely, when the balance 24 rotates in the clockwise direction, the impulse pallet 26 passes between the teeth 4 of the escape wheel 2, without effect on the latter, and drives the detent spring 18. The detent spring 18 leaves its bearing against the beak 12 of the body 8 of the detent 10, without driving the latter, and escapes the field of action of the impulse pallet 26. Finally, the detent spring 18 falls back to bear on the beak 12 of the body 8 of the detent 10, without performing any function. It is therefore understood that the alternation during which the balance 24 rotates in the clockwise direction is the alternation also called “coup perdu” during which the escape wheel 2 does not give an impulse to the balance 24.

A second embodiment of a detent escapement is illustrated in FIG. 2 appended to the present patent application. This type of escapement is described in the work entitled “Escapements and stepper Motors” by MM. Charles Huguenin, Samuel Guye and Maurice Gauchat the second enlarged edition of which was published by FET editions in 1974, page 169, FIG. 17-4.

In FIG. 2, it can be seen that the detent escapement, designated as a whole by the general reference numeral 28, is composed of the following elements:

- escape wheel 30 provided with teeth 32;
- stone 34;
- body 36 of a detent 38;
- frame 42 of a timepiece equipped with the detent escapement 28;
- detent spring 44;
- disengagement pallet 46 carried by a plate 48 of a balance 50;
- impulse pallet 52.

It can be seen that the detent escapement 28 illustrated in FIG. 2 differs from the detent escapement 1 described above in connection with FIG. 1 by the absence of the leaf spring 16, replaced by a return spring 54 such as a spiral spring connected to the frame 42 of the timepiece by its last outer coil 56, and connected by its first inner coil 58 to the body 36 of the detent 38 at a point 60 where this body 36 is pivoted. Since the body 36 of the detent 38 is pivoted, it is referred to as a “pivoted” detent escapement.

Yet another example of a detent escapement well known to the person skilled in the art is that imagined by Abraham-Louis Breguet, a brief description of which is provided in connection with FIG. 402 of the work published in London in 1975 by George Daniels and entitled “The art of Breguet”, and which is reproduced in FIG. 3 appended to the present patent application.

The Breguet escapement is also a “pivoted” detent escapement because this detent 62 is indeed pivoted about a pivot axis 64, but this pivoted detent escapement differs mainly from other embodiments of detent escapements by the absence, on the detent, of a detent spring, replaced by a hook 66 pivoted on a plate 68 of a balance 70 and returned by a spring 72.

Since that time, other embodiments of detent escapements have been proposed. All of these detent escapements have in common that they are known for their chronometric qualities. However, it was quickly realised that these detent escapements reacted poorly to shocks and sudden movements that cause the escape wheel to jump.

On the other hand, the leaf springs and the detent springs necessary for the operation of detent escapements are long and tedious to manufacture, so that their cost price is high. Furthermore, since these springs are very thin, they are sensitive to wear and brittle. It is for this reason that the integration of a detent escapement in worn watches, in particular wristwatches, has always been very delicate and rarely applied.

Nevertheless, given the remarkable chronometric qualities of detent escapements, several attempts have been made to be able to make such detent escapements less sensitive to shocks and thus allow to consider their integration into all types of timepieces and, in particular, in wristwatches.

The position wherein the escape wheel is locked on the abutment of the detent must be ensured regardless of the conditions: watch worn, shocks, etc. Likewise, it is necessary to release the escape wheel so that it can provide a driving impulse to the balance. It is also necessary to allow the passage of the balance without influence on the detent during the alternation without impulse, then to ensure the return of the detent and its stone in the path of the escape wheel at the end of the impulse to stop the rotation of this escape wheel.

As understood from the above, in traditional detents, the return and locking are ensured by a spring carried by the body of the detent. This return of the detent can also be provided by a spiral spring combined with a pivoted detent as described in particular in the book "Escapement and stepper motors" mentioned above. As these springs are not pre-wound, the force they oppose to unlocking the escape wheel in its rest position on the detent in the event of shocks applied to the horological movement is very low.

As understood from the above, in conventional detents, the passage of the balance without influence on the detent during the alternation without impulse is ensured by a very fine and very fragile detent spring, generally made of gold, such as the detent springs 18 or 44.

In the case of the non-pivoted detent escapement shown in FIG. 1, the manufacture of the detent spring 18 of the detent 10 body 8 is a very delicate operation. Indeed, this very small and very fragile detent spring 18 is difficult to manufacture. Furthermore, this detent body spring always provides the same elastic force, regardless of the degree of winding of the barrel spring which provides the mechanical energy necessary for the operation of the horological movement wherein the detent escapement is installed. Consequently, when the barrel spring is slightly wound, the constant elastic force opposed by this detent spring impairs the proper operation of the escapement. In particular, the escape wheel, receiving little energy from the barrel spring, experiences more difficulty in overcoming the constant elastic force of the detent spring when it has to disengage from its engagement with the detent, which affects the isochronism qualities of the escapement.

In the case of the pivoted detent escapement shown in FIG. 2, the manufacture and assembly of the return spring 54 on the body 36 of the detent 38 are also very delicate and expensive operations. Furthermore, this solution includes a large number of components to be manufactured. Finally, also in this case, the return spring 54 of the detent 38 body 36 always provides the same elastic force, regardless of the degree of winding of the barrel spring which provides the mechanical energy necessary for the operation of the horological movement wherein the detent escapement is installed. Consequently, when the barrel spring is slightly wound, the constant elastic force opposed by this detent spring impairs the proper operation of the escapement.

In both cases, the manufacture of these detent springs is a very delicate operation. Furthermore, these very small and very thin detent springs are fragile and sensitive to wear. Finally, these detent springs always provide the same elastic force, regardless of the degree of winding of the barrel spring which provides the mechanical energy necessary for the operation of the horological movement wherein the detent escapement is installed. Consequently, when the barrel spring is slightly wound, the constant elastic force opposed by these detent springs impairs the proper operation of the escapement.

In particular, the energy consumed by the detent coup perdu escapements and the frictional forces that must be overcome to release the escape wheel at the moment of the driving impulse are not proportional to the torque supplied by the barrel spring. It therefore seemed interesting to try to dispense with such springs.

SUMMARY OF THE INVENTION

The purpose of the present invention is to solve the problems mentioned above as well as others still by proposing a detent escapement ensuring the functions of locking the rest position on the detent of the escape wheel, of releasing the escape wheel and of passing the balance to its initial position using a simpler mechanism than those used in detent escapements of the prior art and whose operation is therefore more reliable.

To this end, the present invention relates to a detent escapement provided to regulate the operation of a timepiece movement, this detent escapement comprising an escape wheel provided with a plurality of teeth regularly spaced along a perimeter and a balance, the balance being equipped with an impulse pallet by means of which this balance receives driving impulses via the teeth of the escape wheel, the balance being moved by an oscillating movement during which it performs, for each oscillation, an alternation during which it receives a driving impulse and an alternation without a driving impulse, the detent escapement also comprising a hook pivotally mounted on the balance and held bearing by an elastic member against an abutment, the detent escapement being completed by a detent which is able to pivot and which comprises a first arm which collaborates with the escape wheel to ensure blocking the latter just before the start of the driving impulse, as well as a second arm which collaborates with the hook of the balance to allow the escape wheel to disengage from its engagement with the first arm at the start of the driving impulse, and which limits the pivoting of this detent to only part of the oscillation of the balance, the detent also being arranged so that, by cooperation with the escape wheel, its return to the position wherein it again blocks the escape wheel after the latter has finished providing the driving impulse to the balance is assisted by said escape wheel, the detent escapement finally comprising a pulling device which opposes a resistance to the disengagement of the escape wheel during shocks applied to the horological movement when the latter is in its rest position on the detent.

According to special embodiments of the invention:

- the first arm of the detent carries on the one hand a rest pallet against which the escape wheel is bearing by one of its teeth just before the start of a driving impulse, and on the other hand a disengagement pallet against which the pivoting hook of the balance is bearing just before the start of the driving impulse, the pivoting hook being arranged so as to push back the disengagement pallet and to pivot the detent at the start of the part of the alternation of the balance where the impulse takes place, so that the rest pallet disengages from the tooth of the escape wheel with which it is engaged and allows this escape wheel to provide the driving impulse to the balance, and the pivoting hook being arranged so that, during the alternation without impulse of the balance, it is retracted by performing a pivoting movement when it passes at the level of the disengagement pallet, so that the passage of the balance has no influence on the detent during said alternation without impulse, the detent also carrying a return pallet arranged so that the rest pallet again gradually penetrates in the perimeter of the teeth of the escape wheel when the latter finishes providing the driving impulse to the pallet of the balance;

the return pallet is arranged so that, while the escape wheel continues to provide the driving impulse to the impulse pallet of the balance by one of its teeth, it drives the return pallet of the detent by another of its teeth, so that the rest pallet again gradually penetrates in the perimeter of the teeth of the escape wheel;

the first and second arms of the detent are either made in one piece or rigidly connected to each other and able to pivot on a rod;

the first and second arms are connected to each other by means of a rivet;

the first arm of the detent carries the rest pallet against which the escape wheel is bearing by one of its teeth when it is in the rest position as well as the return pallet, and the second arm carries the disengagement pallet;

the first and second arms extend in two planes which are parallel and distant from each other, so that the rest and return pallets on the one hand, and the disengagement pallet on the other hand, are stepped;

the rest and return pallets are disposed on either side of the pivot axis;

the rest and return pallets are parallelepipedal in shape, terminated in inclined planes and extend parallel to each other;

the second arm carries a shock-resistant member intended to penetrate into a clearance made in the periphery of a balance plate;

the pivoting travel of the detent is limited by an impulse abutment on the one hand, and by a rest abutment on the other hand, the second arm of the detent abutting against the impulse abutment when the escape wheel communicates a driving impulse to the balance, and against the rest abutment when the escape wheel returns to its rest position.

Thanks to these features, the present invention provides a detent escapement whose functions of locking of the rest position on the detent of the escape wheel, of release of the escape wheel at the moment of the driving impulse and of idle passage of the balance at the coup perdu are no longer ensured by a mechanism involving a detent body carrying an elastic blade and returned by a detent spring, or a pivoted detent body including a return spring, but by a simple hook and a spring carried by the balance and cooperating with a disengagement pallet and a return pallet carried by the detent. Therefore, one can avoid having to resort to these fine springs used in detent escapements of the prior art which are very difficult to manufacture, fragile and sensitive to wear and which, by opposing a constant elastic force, increase the risk of stopping during idle passage, limit the starting of the escapement, in particular when the barrel spring is slightly wound, and adversely affect the isochronic qualities of the detent escapements.

On the contrary, thanks to the present invention, triggering of the impulse is ensured by a hook which, by acting on a disengagement pallet carried by the detent, allows the escape wheel to be released from its abutment on the rest pallet also carried by the detent. Likewise, the hook is retracted by pivoting when the balance returns to its initial position. The present invention thus allows to dispense with any spring playing an active role in the release of the escape wheel. The return of the hook during the coup perdu is ensured by a spring which is simple and easier to produce. This arrangement allows to provide a detent escapement mechanism whose operation is much more reliable and precise. Furthermore, since, after the release of the escape wheel, the latter provides its driving impulse directly to the balance, without the intervention of any spring, the mechanical forces involved in the detent escapement mechanism according to the invention are always proportional. Indeed, if the barrel spring is highly wound, it provides the escape wheel with high mechanical power thanks to which its locking torque on the detent provided by the pulling device is high and, in turn, the escape wheel provides a high driving impulse to the regulator device. Conversely, if the barrel spring is slightly wound, the escape wheel receives low mechanical power, so that its locking torque on the detent provided by the pulling device is low, this mechanical power then being directly transmitted to the balance which will be weakly requested. The locking torque of the escape wheel on the detent is thus always proportional to the torque supplied by the barrel spring, the oscillation frequency of the balance will therefore constantly adapt according to the degree of winding of the barrel spring, which allows to guarantee that the isochronism of the detent escapement according to the invention is maintained regardless of the winding conditions of the barrel spring. Moreover, the detent is arranged so that, by cooperation with the escape wheel, its return to the position wherein it again blocks the escape wheel after the latter has finished providing the driving impulse to the balance is assisted by said escape wheel. Thus, the return of the detent to its blocking position of the escape wheel takes place by simple cooperation between this detent and this escape wheel, without using any spring, which simplifies the manufacture of the detent escapement according to the invention and makes its operation much more reliable.

BRIEF DESCRIPTION OF THE FIGURES

Other features and advantages of the present invention will emerge more clearly from the detailed description which follows of an exemplary embodiment of a detent escapement according to the invention, this example being given purely in an illustrative and non-limiting manner only in connection with the appended drawing on which.

DETAILED DESCRIPTION OF AN EMBODIMENT OF THE INVENTION

The present invention proceeds from the general inventive idea which consists in providing a detent escapement wherein the release of the escape wheel to provide the driving impulse to the balance during the first alternation of an oscillation, and the return, without energy input, of this balance to its initial position during the second alternation, also called "coup perdu", of the same oscillation, are performed without assistance from a spring carried by the detent and without a return spring. Thanks to the invention, it is thus possible to dispense with the springs conventionally used in detent escapements, which are known to be very delicate to be machined, fragile and sensitive to wear. Furthermore, since the escape wheel is in direct engagement with the balance, there is a constant match between the mechanical energy supplied by the barrel spring and the energy supplied to the balance. If the barrel spring is highly wound, the escape wheel provides the balance with a high mechanical impulse, the amplitude of oscillation of the balance is also high and the force consumed to release the escape wheel is high; conversely, if the barrel spring is slightly wound, the escape wheel provides the balance with a mechanical impulse of low intensity, so that the amplitude of oscillation of the balance weakens as the force consumed for the release of the escape wheel.

Consequently, for its operation, the detent escapement according to the invention does not oppose high mechanical resistance when the barrel spring is slightly wound, so that its isochronic properties are not affected. Moreover, according to another aspect of the invention, the return of the detent to the position wherein it ensures blocking the escape wheel after the latter has provided the driving impulse to the balance is assisted by the wheel escapement itself, without the need for a spring. The manufacture of the spiral escapement according to the invention is therefore facilitated and the reliability of its operation significantly increased.

Figure 1:
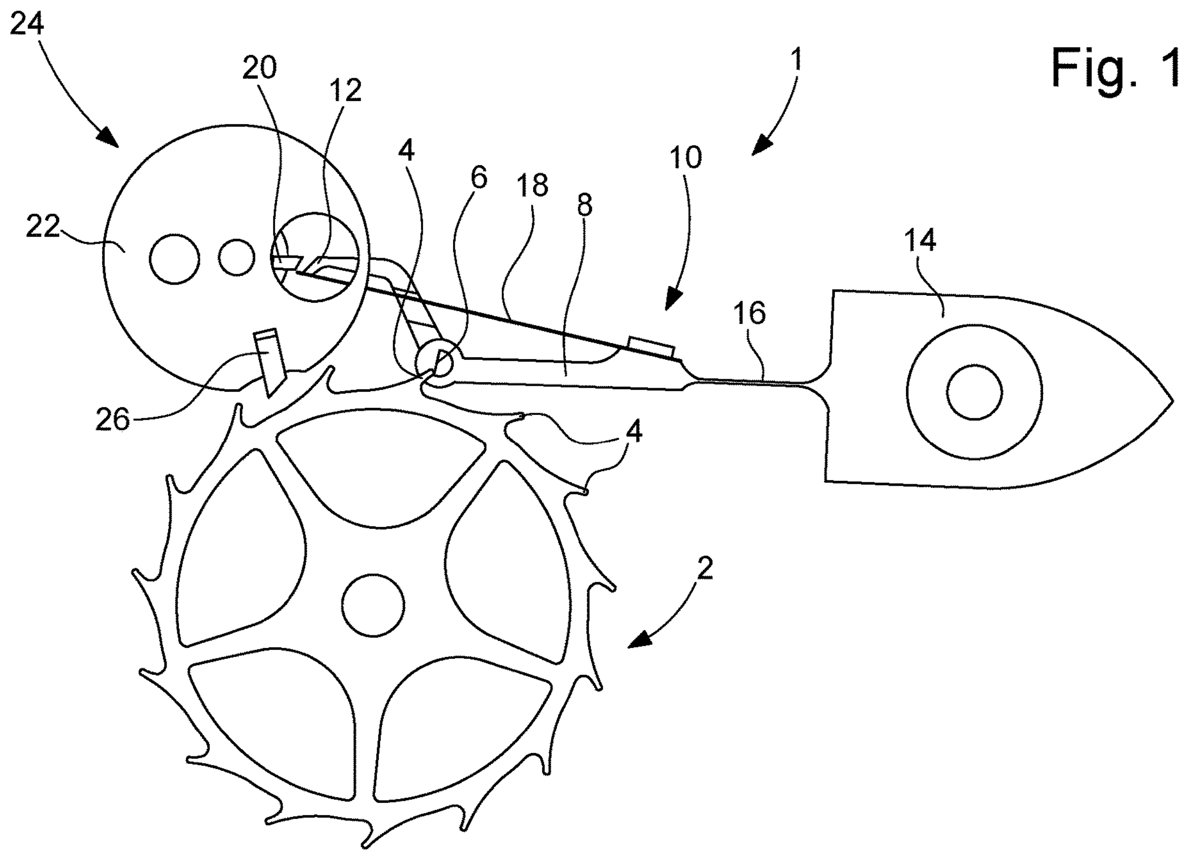
FIG. 1, already mentioned, is a schematic representation of a detent escapement according to the prior art comprising a leaf spring and a detent spring.
Figure 2:
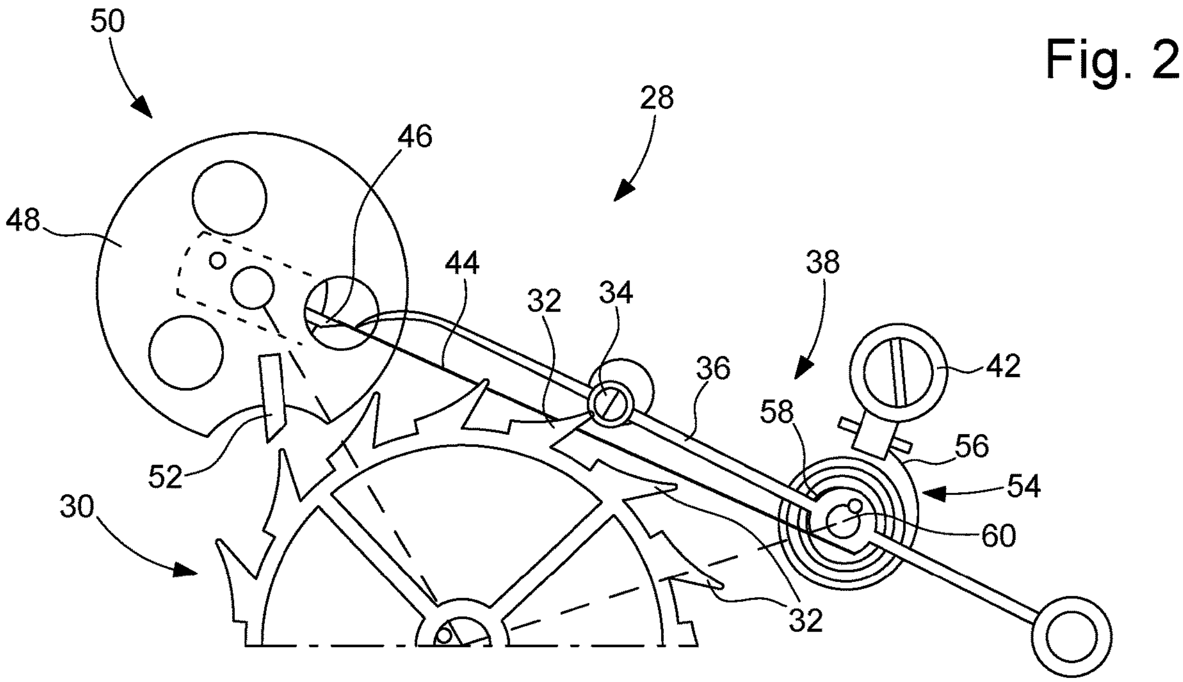
FIG. 2, already mentioned, is a representation of a first embodiment of a pivoted detent escapement according to the prior art.
Figure 3:
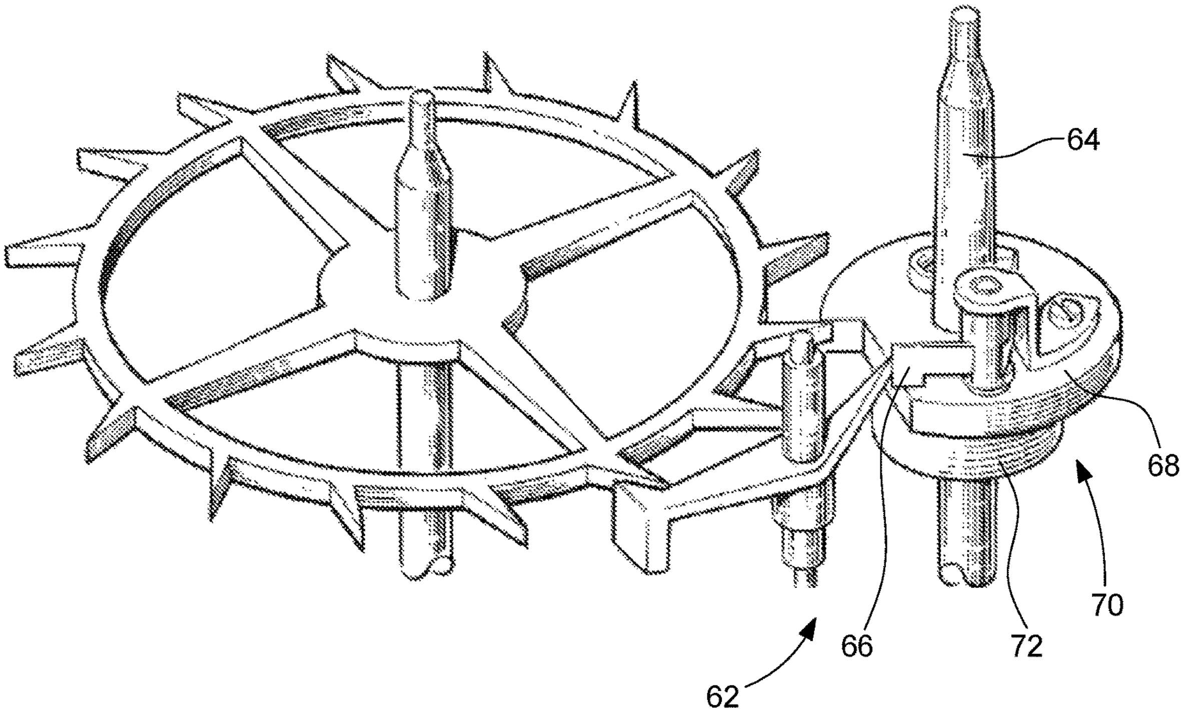
FIG. 3, already mentioned, is a representation of a second embodiment of a pivoted detent escapement according to the prior art, also called a Breguet detent.
Figure 4:
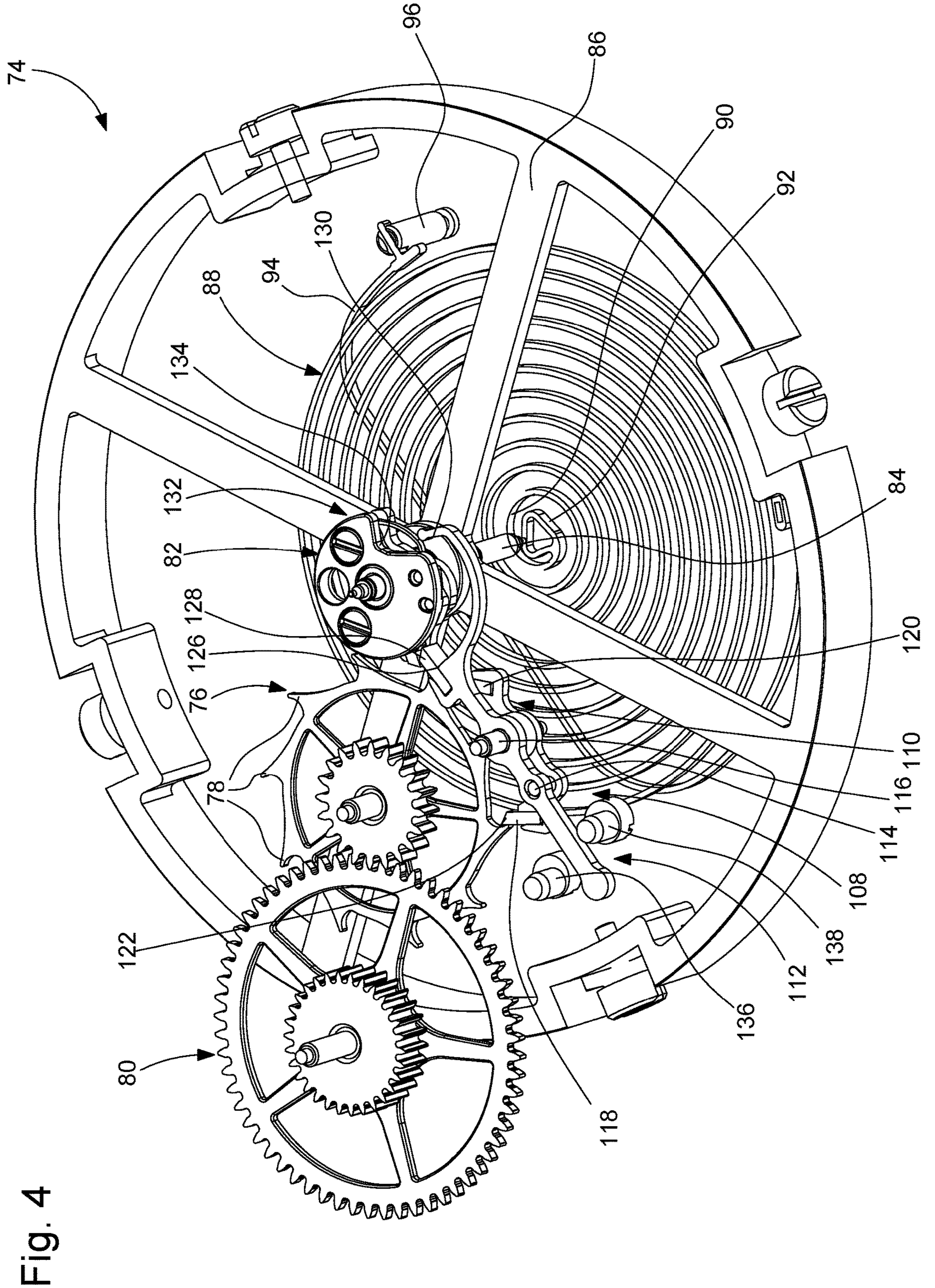
FIG. 4 is a perspective view of the detent escapement according to the invention in its entirety.

Designated by general reference numeral 74, the detent escapement shown in FIG. 4 is intended to be mounted in a timepiece, in particular a wristwatch (not shown). This detent escapement 74 comprises in particular an escape wheel 76 provided with a plurality of regularly spaced teeth 78. This escape wheel 76 is conventionally driven by the gear train 80 of the timepiece which receives its driving force from one or more barrel springs (not shown in the drawing).

The detent escapement 74 is completed by a balance 82 mounted on a rod 84 and whose oscillations are maintained by a spiral spring 88. On the side of its last coil on the inside 90, the spiral spring 88 is conventionally fixed on the rod 84 of the balance 82 by means of a collet 92, while on the side of its last coil on the outside 94, the spiral spring 88 is fixed to a stud 96.

Figure 5A:
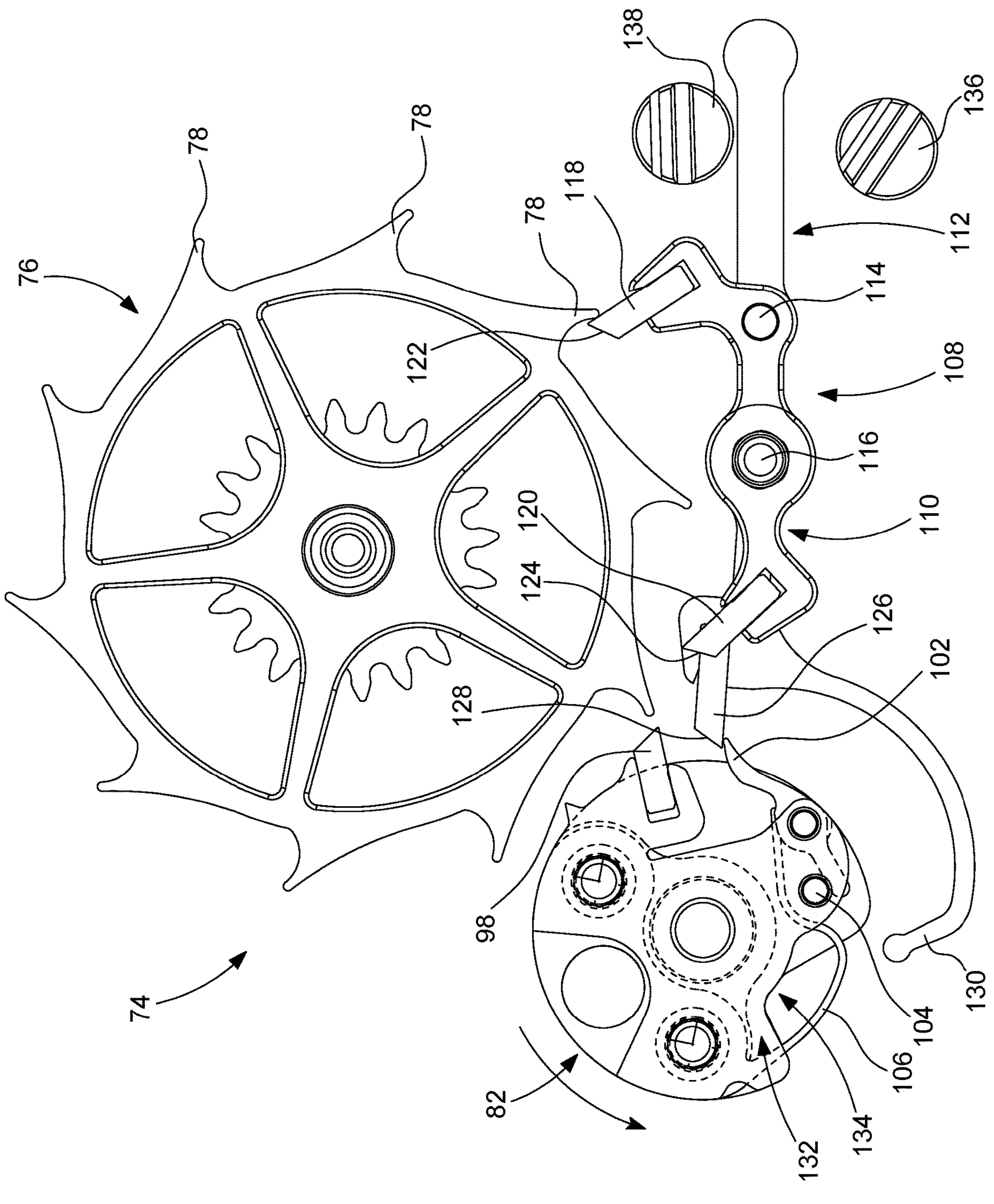
FIG. 5A is a schematic representation of the detent escapement according to the invention in its rest position.

As can be seen in FIG. 5A, the balance 82 is equipped with an impulse pallet 98 by means of which the balance 82 receives driving impulses via the teeth 78 of the escape wheel 76. This impulse pallet 98 is, in a preferred but non-limiting manner, in the shape of a small piece of ruby, sapphire, garnet or the like in the shape of a parallelepiped, embedded in the balance 82 and terminated at its free end by an inclined plane 100.

A hook 102 pivotally mounted on the balance 82 and held bearing against an abutment 104 by an elastic member 106 can also be seen in FIG. 5A. In the example shown in the drawing, the elastic member 106 is carried by the balance 82. This elastic member 106 of the simple spring type acts as the detent spring in conventional detent escapements. Its function is to allow the detent body to disengage from its engagement with the escape wheel at the start of the driving impulse. Once again, it is observed that the detent escapement according to the invention does not also comprise a return spring.

According to the invention, the detent escapement 74 also comprises a detent 108. This detent 108 is formed of a first and a second arm, respectively 110 and 112, these first and second arms 110 and 112 being rigidly connected to each other, for example by means of a rivet 114, and being able to pivot on a rod 116. In the example shown in the drawing, the first and second arms 110 and 112 are manufactured separately from each other, then assembled to each other, for example by riveting. It goes without saying that these first and second arms 110 and 112 can just as easily be made in one piece, for example by moulding.

The first arm 110 carries a rest pallet 118 at a first end, and a return pallet 120 at a second end. These rest 118 and return 120 pallets are disposed on either side of the pivot axis 116 of the detent 108; they are preferably in the shape of two small pieces of ruby, sapphire, garnet or the like in the shape of a parallelepiped and are embedded in each of the ends of the first arm 110. These rest 118 and return 120 pallets are terminated by inclined planes 122 and 124 through which they cooperate with the teeth 78 of the escape wheel 76. These rest 118 and return 120 pallets extend preferably but not necessarily parallel to one another.

As for the second arm 112, it carries at one of its ends a disengagement pallet 126 of the same type as the other pallets described above and terminated at its free end by an inclined plane 128. This second arm 112 also carries a shock-resistant device 130.

FIG. 4 further shows that the balance 82 comprises a plate 132 in the periphery of which is made a clearance 134 into which the shock-resistant member 130 is penetrated under conditions which will be detailed below. It is also observed that the first and second arms 110 and 112 extend in two planes which are parallel and distant from each other, so that the rest and return pallets 118 and 120 on the one hand, and the disengagement pallet 126 on the other hand are stepped.

Finally, the travel of the first arm 110 and therefore of the detent 108 as a whole is limited by an impulse abutment 136 on the one hand, and by a rest abutment 138 on the other hand.

In FIG. 5A, the escape wheel 76 has rotated in the clockwise direction and is in its rest position wherein it is bearing by one of its teeth 78 against the rest pallet 118 carried by the first arm 110 of the detent 108. As for the balance 82, it has rotated in the counter-clockwise direction, so that its pivoting hook 102 is in contact with the disengagement pallet 126 of the second arm 112.

Figure 5B:
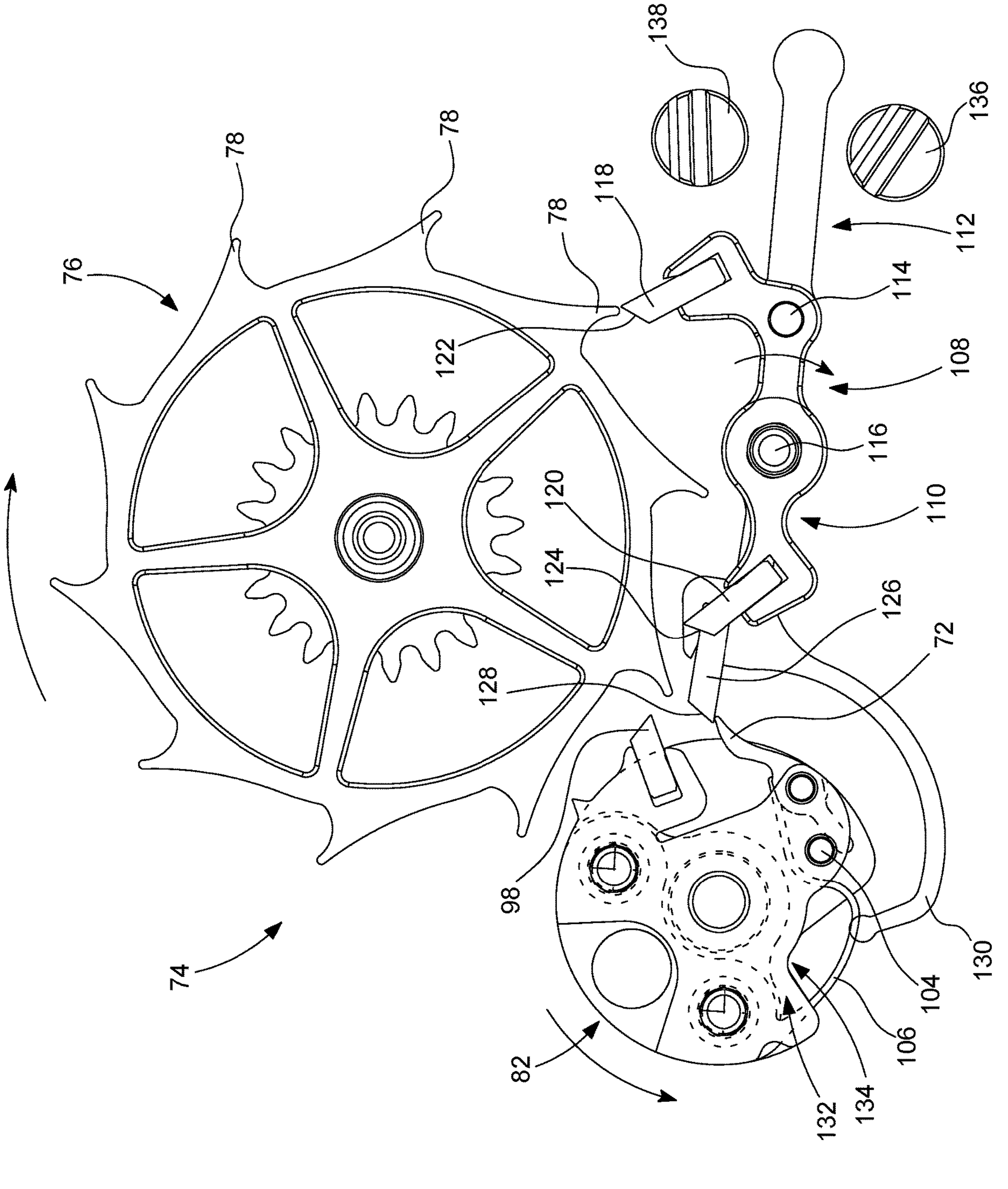
FIG. 5B is a view similar to that of FIG. 5A, the detent escapement being in a position wherein the escape wheel begins to disengage from its engagement with the rest pallet and can provide a driving impulse to the balance.

In FIG. 5B, the balance 82 always tends to rotate in the counter-clockwise direction, so that its pivoting hook 102 pushes back the disengagement pallet 126 of the second arm 112, which pivots the entire detent 108 in the clockwise direction. Under the effect of this pivoting, the rest pallet 118 is disengaged from its engagement with the tooth 78 of the escape wheel 76, which enables the latter to rotate freely in the clockwise direction.

Figure 5C:
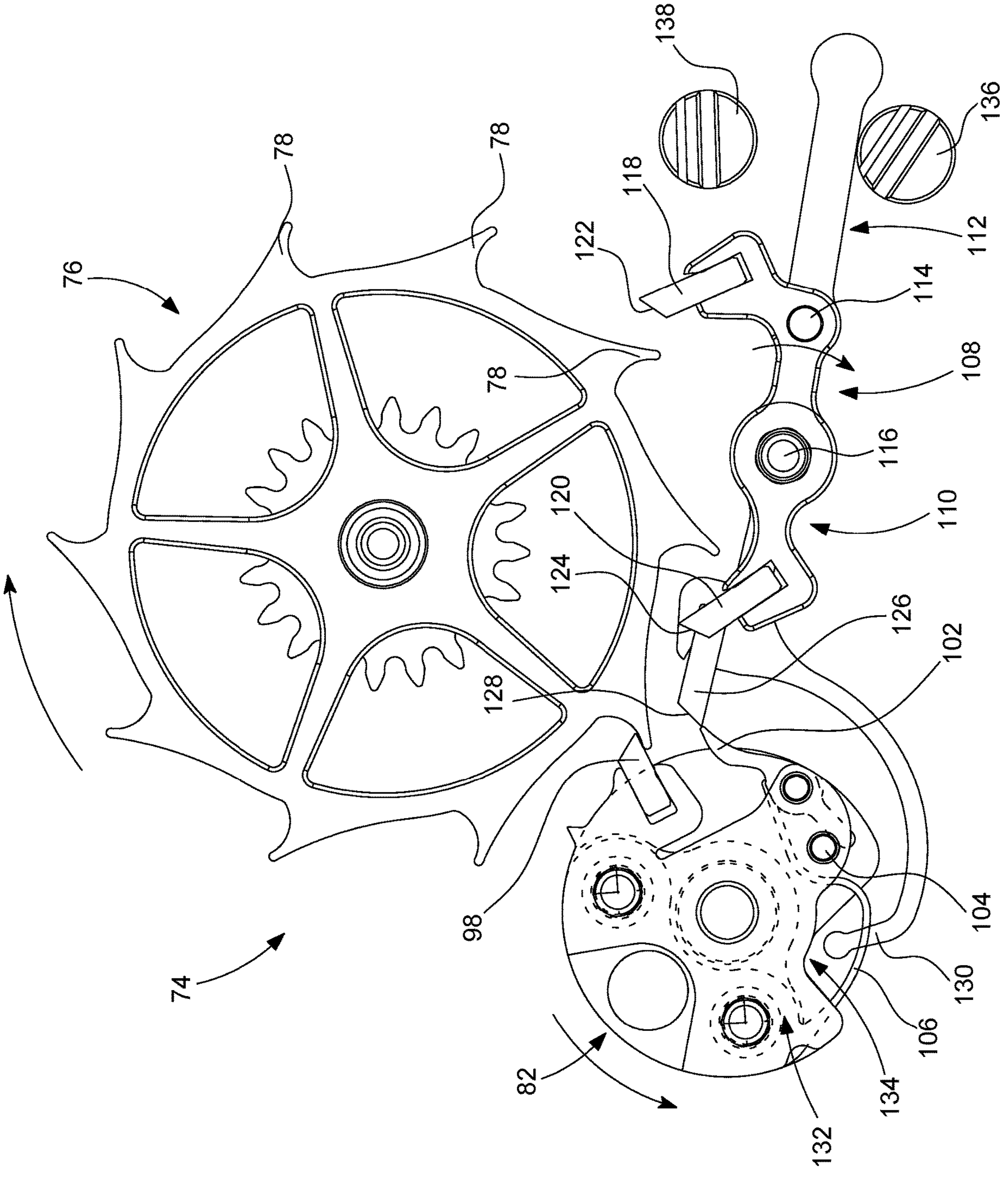
FIG. 5C is a view similar to that of FIG. 5B wherein the escape wheel rotates and transmits its motor torque to the impulse pallet of the balance.

In FIG. 5C, the escape wheel 76 rotates freely in the clockwise direction and transmits, via one of its teeth 78, a driving impulse to the impulse pallet 98, which causes the balance 82 to rotate in the counter-clockwise direction.

Figure 5D:
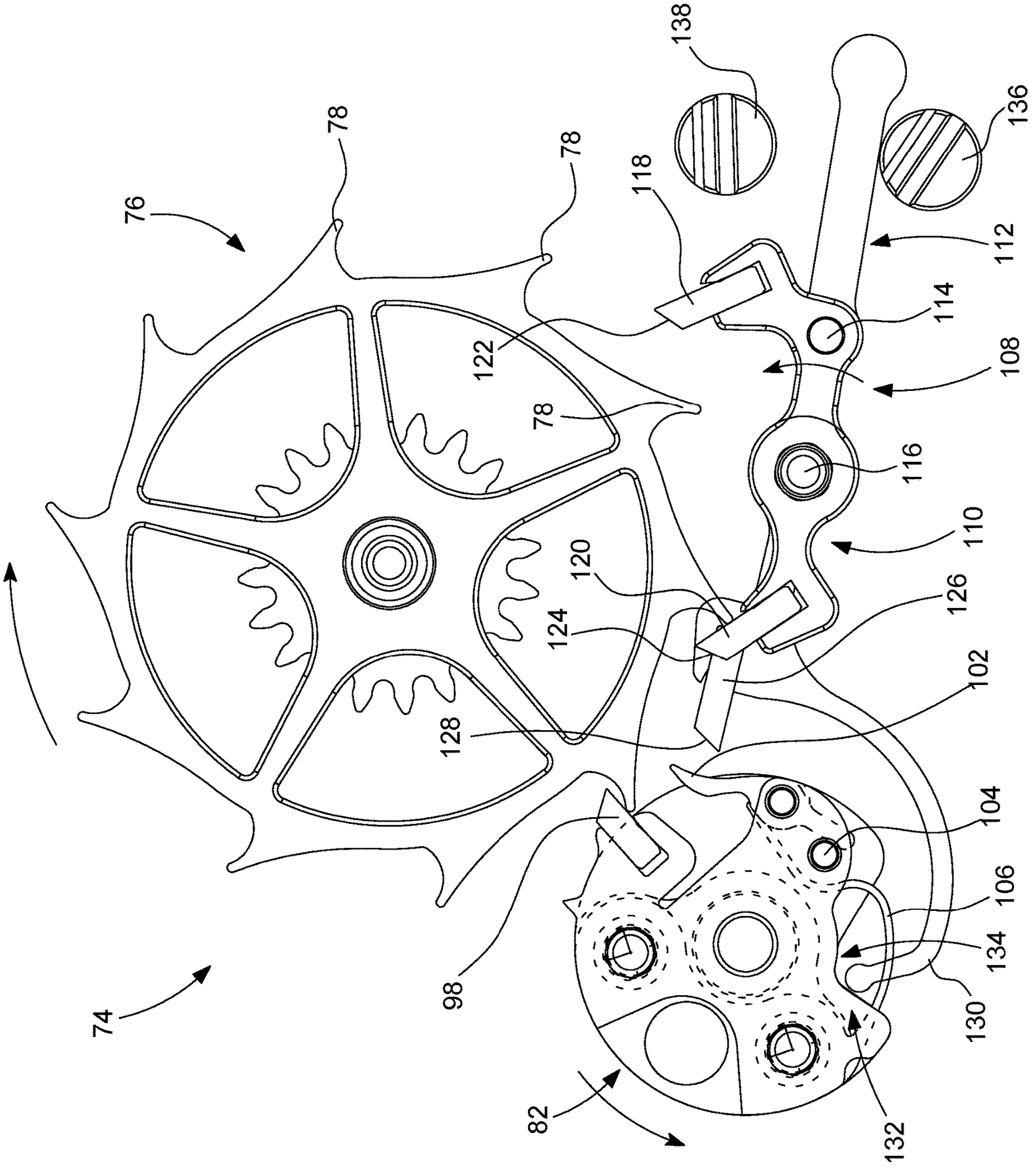
FIG. 5D is a view similar to that of FIG. 5C, the escape wheel continuing to provide the driving impulse to the balance while driving the return pallet of the detent.

In FIG. 5D, the escape wheel 76 continues to provide the driving impulse to the impulse pallet 98 of the balance 82 through one of its teeth 78, while by another of its teeth 78 it drives the return pallet 120 of the detent 108. The entire detent 108 thus tends to rotate in the counter-clockwise direction, so that the rest pallet 118 again gradually penetrates in the perimeter of the teeth 78 of the escape wheel 76. It is also observed that, in the position illustrated in FIG. 5D, the shock-resistant member 130 is located at the bottom of the clearance 134 made in the plate 132 carried by the balance 82, in order not to interfere with the pivoting of the detent 108 during the impulse phase which extends from FIG. 5A to FIG. 5E. During the remainder of the oscillation of the balance 130, the function of this shock-resistant member 130 is, by contact with the plate 132 of the balance 130, to limit the pivoting of the detent 108 in the event of a shock applied to the horological movement and to prevent the accidental unlocking of the escape wheel 76 when the latter is in its rest position on the detent 108.

Figure 5E:
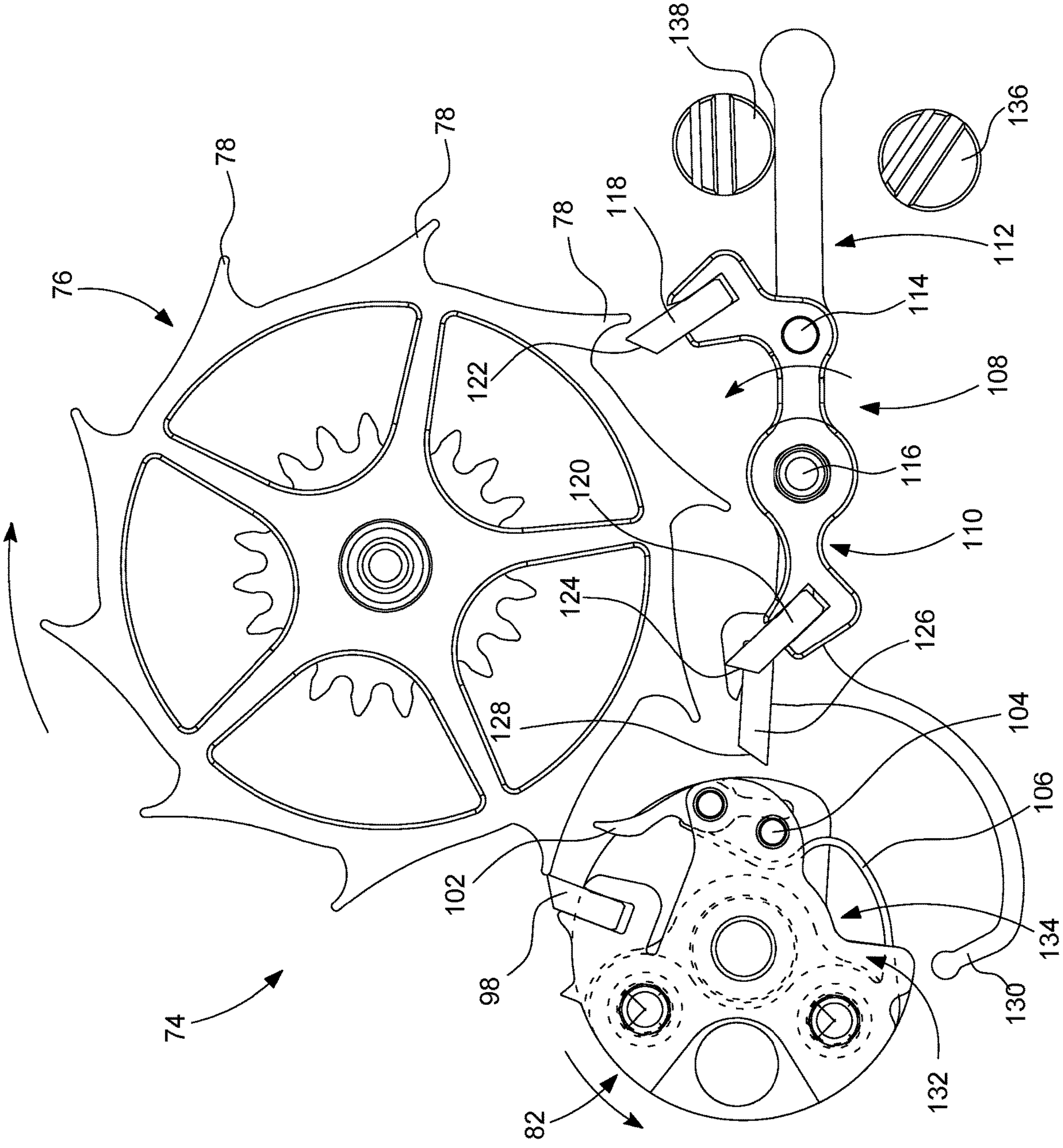
FIG. 5E is a view similar to that of FIG. 5D wherein the escape wheel finishes providing the driving impulse to the balance, while the rest pallet is again in the perimeter of the teeth of the escape wheel.

In FIG. 5E, the escape wheel 76 finishes providing the driving impulse to the impulse pallet 98 of the balance 82 and the rest pallet 118 is again in the perimeter of the teeth 78 of the escape wheel 76.

Figure 5F:
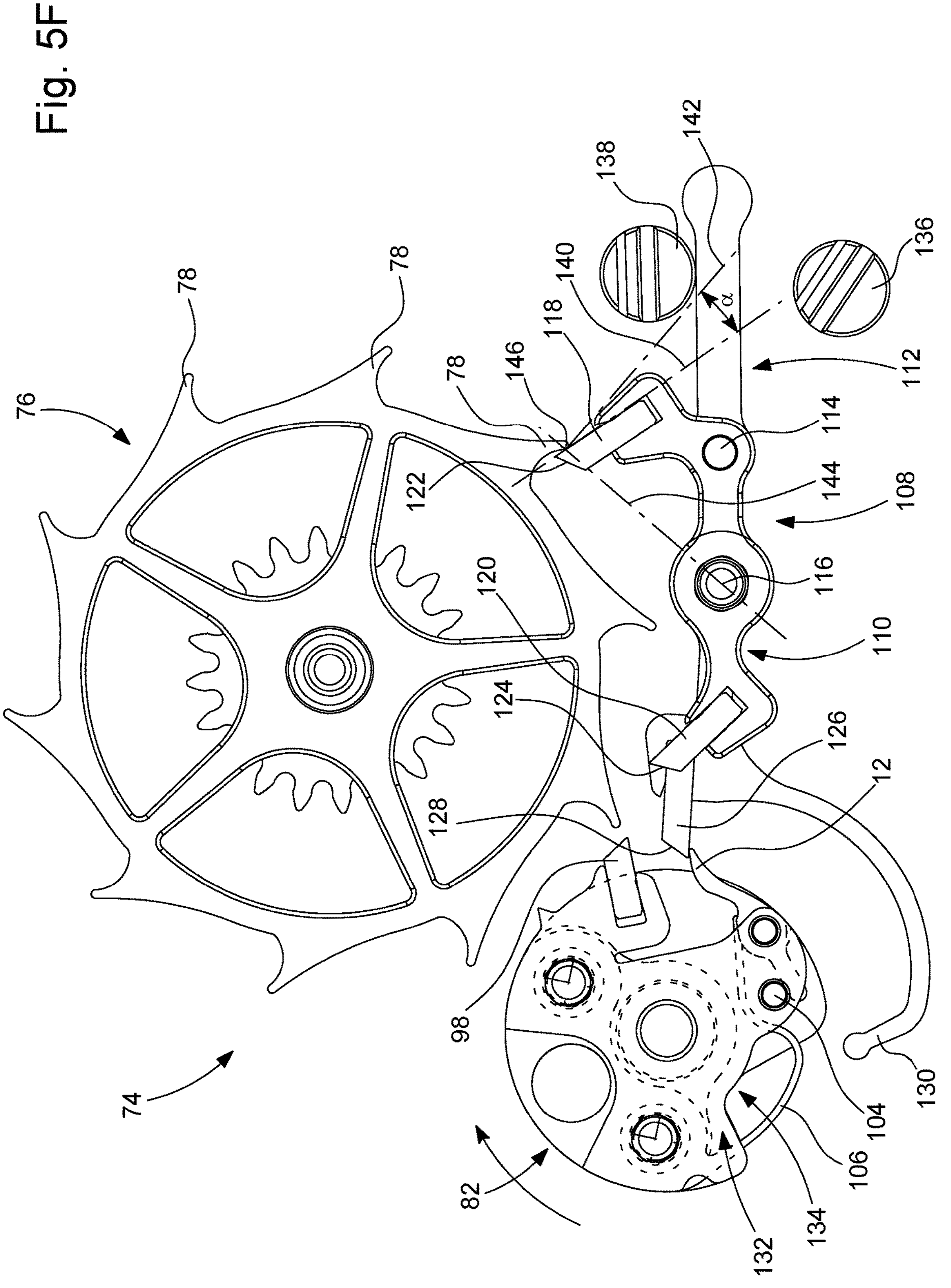
FIG. 5F is a view similar to that of FIG. 5E wherein the escape wheel is at rest, while the balance pivots in the clockwise direction and performs its idle alternation, also called coup perdu.
Figure 6:
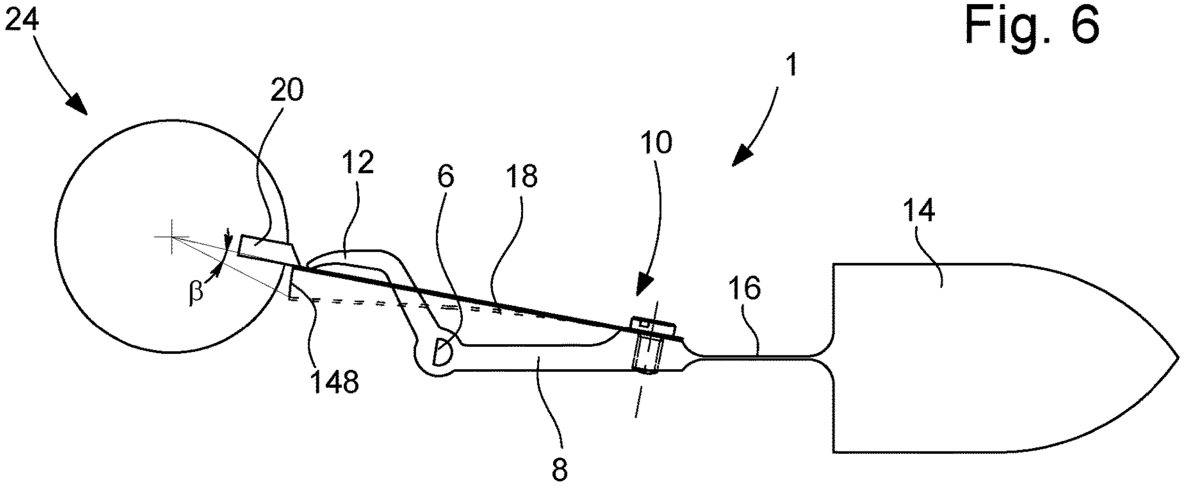
FIG. 6 illustrates, in the case of a detent escapement of the prior art of the type illustrated in FIG. 1, the angle traversed by the balance plate and the trajectory described by the detent spring during the coup perdu.
Figure 7:
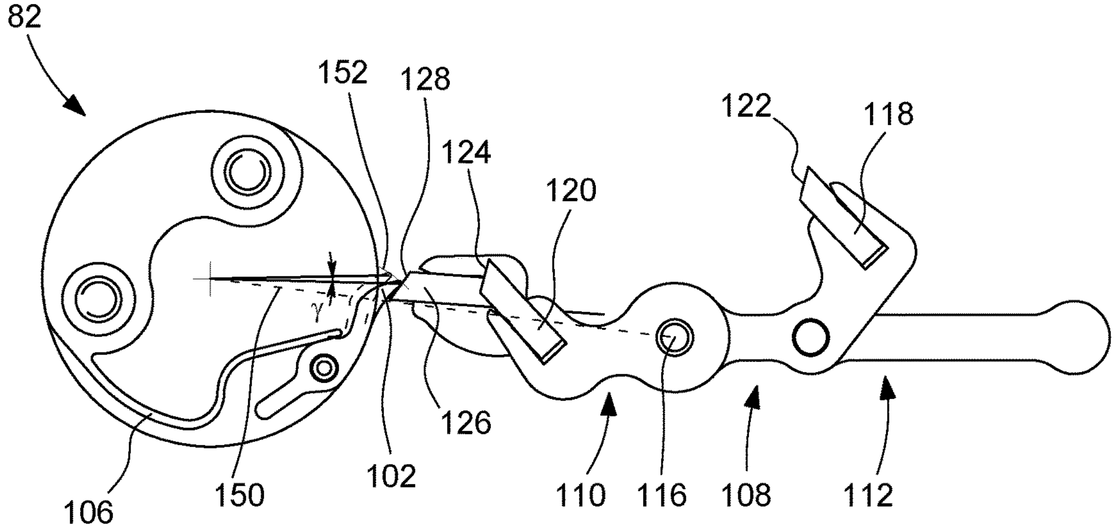
FIG. 7 illustrates, in the case of a detent escapement according to the invention, the angle traversed by the balance plate and the trajectory described by the pivoting hook during the coup perdu.

In FIG. 5F, the escape wheel 76 is at rest, bearing by one of its teeth 78 on the rest pallet 118. From this moment, the escape wheel 76 is held against the rest pallet 118 with a certain force. This is a safety device for maintaining the escape wheel 76 while the balance 82 performs its idle alternation also called coup perdu, a device called pulling device which opposes a resistance to the disengagement of the rest pallet 118 during shocks applied to the timepiece. The pulling is generally defined by an angle $\alpha$ formed by a rest plane 140 of the rest pallet 118 and a perpendicular 142 raised over a radius 144 of the detent 108, at the point of contact 146 of the tooth 78 and the rest pallet 118. The value of the pulling angle $\alpha$ is in a preferred but non-limiting manner comprised between 5° and 20°, knowing that the higher this value, the better the immunisation of the escapement to shocks and accelerations, but the more the escape wheel will have difficulty disengaging from its engagement with the detent at the start of the driving impulse, which affects the mechanical efficiency and the isochronism of the escapement. Conversely, the lower the value of the pulling angle $\alpha$, the easier it will be for the escape wheel to escape the engagement with the detent at the start of the driving impulse and therefore the better the efficiency and the isochronism. On the other hand, the resistance of the detent escapement according to the invention to shocks will be less. As for the balance 82, it pivots in the clockwise direction and performs its idle alternation also called coup perdu. During the return movement of the balance 82, the pivoting hook 102 retracts when it passes at the level of the disengagement pallet 126 by performing a pivoting movement according to a radius close to that of the balance 82, so that the passage of the balance 82 has no influence on the detent 108 during said alternation without impulse. Indeed, as illustrated in FIG. 6, in the case of a detent escapement of the prior art, during the coup perdu, given that the detent spring 18 is deformed over a large radius and that its free end traverses a trajectory 148 which is substantially tangent to the external diameter of the plate 22 of the balance 24, this plate 22 traverses an angle $\beta$ of 13.8°. On the contrary, according to the invention (see FIG. 7), the pivoting centre of the pivoting hook 102 is offset with respect to a centre line 150 which joins the pivoting centre of the detent 108 to the pivoting centre of the balance 102 and the free end of the pivoting hook 102 pivots according to a radius smaller than the radius according to which the detent spring 18 of the prior art is deformed and describes a trajectory 152 which is more oriented towards the centre of the balance plate 82. Consequently, the angle $\gamma$ traversed by the plate of the balance 82 during the coup perdu is much smaller, typically of the order of 2.5° in the present case, so that the detent escapement according to the invention is much less disturbed, which has a beneficial effect on the isochronism of the escapement.

It goes without saying that the present invention is not limited to the embodiment which has just been described and that various simple modifications and variants can be considered by the person skilled in the art without departing from the scope of the invention as defined by the appended claims. It will be understood in particular that instead of the rest 118, return 120 and disengagement 126 pallets, the detent 108 could be provided with surfaces that are integral therewith and by which it would cooperate directly with the escape wheel 76 and the balance 82.

NOMENCLATURE

1. Detent escapement
2. Escape wheel
4. Teeth
6. Stone
8. Body
10. Detent
12. Beak
14. Frame
16. Leaf spring
18. Detent spring
20. Disengagement pallet
22. Plate
24. Balance
26. Impulse pallet
28. Detent escapement
30. Escape wheel
32. Teeth
34. Stone
36. Body
38. Detent
42. Frame
44. Detent spring
46. Disengagement pallet
48. Plate
50. Balance
52. Impulse pallet
54. Return spring
56. Last outer coil
58. First inner coil

60. Point
62. Detent
64. Pivot axis
66. Hook
68. Plate
70. Balance
72. Spring
74. Detent escapement
76. Escape wheel
78. Escape wheel teeth
80. Gear train of the timepiece
82. Balance
84. Rod
88. Spiral spring
90. Last coil on the inside
92. Collet
94. Last coil on the outside
96. Stud
98. Impulse pallet
100. Inclined plane
102. Pivoting hook
104. Abutment
106. Elastic member
108. Detent
110. First arm
112. Second arm
114. Rivet
116. Pivot axis
118. Rest pallet
120. Return pallet
122. Inclined plane
124. Inclined plane
126. Disengagement pallet
128. Inclined plane
130. Shock-resistant member
132. Plate
134. Clearance
136. Impulse abutment
138. Rest abutment
$\alpha$ Pulling angle
140. Rest plane
142. Perpendicular
144. Radius
146. Point of contact
148. Trajectory
$\beta$. Angle
150. Centre line
152. Trajectory
$\gamma$. Angle

The invention claimed is:

1. A detent escapement provided to regulate an operation of a timepiece movement, said detent escapement comprising an escape wheel provided with a plurality of teeth regularly spaced along a perimeter and a balance, the balance being equipped with an impulse pallet with which said balance receives driving impulses via the teeth of the escape wheel, the balance being moved by an oscillating movement during which the balance performs, for each oscillation, an alternation during which the balance receives a driving impulse and an alternation without the driving impulse, the detent escapement also comprising a hook pivotally mounted on the balance and held bearing by an elastic member against an abutment, the detent escapement being completed by a detent which is configured to pivot and which comprises a first arm which collaborates with the escape wheel to ensure blocking the escape wheel just before a start of the driving impulse, as well as a second arm which collaborates with the hook of the balance to allow the escape wheel to disengage from an engagement of the escape wheel with the first arm at the start of the driving impulse, and which limits the pivoting of said detent to only part of the oscillation of the balance, the detent also being arranged so that, by cooperation with the escape wheel, a return of the detent to a position wherein the detent again blocks the escape wheel after the escape wheel has finished providing the driving impulse to the balance is assisted by said escape wheel, the detent escapement comprising a pulling device which opposes a resistance to the disengagement of the escape wheel during shocks applied to a horological movement when the escape wheel is in a rest position on the detent.

2. The detent escapement according to claim 1, wherein the first arm of the detent carries a rest pallet against which the escape wheel is bearing by one of teeth of the escape wheel just before the start of the driving impulse, and a disengagement pallet against which the pivoting hook of the balance is bearing just before the start of the driving impulse, the pivoting hook being arranged so as to push back the disengagement pallet and to pivot the detent at the start of the part of the alternation of the balance where the impulse takes place, so that the rest pallet disengages from the tooth of the escape wheel with which the rest pallet is engaged and allows said escape wheel to provide the driving impulse to the balance, and the pivoting hook being arranged so that, during the alternation without impulse of the balance, the pivoting hook is retracted by performing a pivoting movement when the pivoting hook passes at a level of the disengagement pallet, so that a passage of the balance has no influence on the detent during said alternation without impulse, the detent also carrying a return pallet arranged so that the rest pallet again gradually penetrates in the perimeter of the teeth of the escape wheel when the escape wheel finishes providing the driving impulse to the impulse pallet of the balance.

3. The detent escapement according to claim 2, wherein the return pallet is arranged so that, while the escape wheel continues to provide the driving impulse to the impulse pallet of the balance by one of the teeth of the escape wheel, the escape wheel drives the return pallet of the detent by another of the teeth of the escape wheel, so that the rest pallet again gradually penetrates in the perimeter of the teeth of the escape wheel.

4. The detent escapement according to claim 2, wherein the first arm and the second arm are rigidly connected to each other and form an assembly configured to pivot on a rod.

5. The detent escapement according to claim 3, wherein the first arm and the second arm are rigidly connected to each other and form an assembly configured to pivot on a rod.

6. The detent escapement according to claim 4, wherein the first and second arms are connected to each other with a rivet.

7. The detent escapement according to claim 4, wherein the first and second arms are made in one piece.

8. The detent escapement according to claim 4, wherein the first and second arms extend in two planes which are parallel and distant from each other, so that the rest and return pallets on the one hand, and the disengagement pallet on the other hand, are stepped.

9. The detent escapement according to claim 4, wherein the rest and return pallets are disposed on either side of a pivot axis.

10. The detent escapement according to claim 4, wherein the rest and return pallets are parallelepipedal in shape, terminated in inclined planes and extend parallel to each other.

11. The detent escapement according to claim 4, wherein the second arm carries a shock-resistant member intended to penetrate into a clearance made in a periphery of a balance plate when the escape wheel finishes providing the driving impulse to the balance.

12. The detent escapement according to claim 4, wherein the pivoting travel of the detent is limited by an impulse abutment on the one hand, and by a rest abutment on the other hand, the detent abutting against the impulse abutment when the escape wheel communicates the driving impulse to the balance, and the detent abutting against the rest abutment when the escape wheel returns to the rest position.

13. The detent escapement according to claim 11, wherein the elastic member is carried by the plate of the balance.

14. The detent escapement according to claim 12, wherein the elastic member is carried by a plate of the balance.

15. The detent escapement according to claim 2, wherein the pulling device is formed by the rest pallet a rest plane of which forms an angle α with a perpendicular raised over a radius of the detent, at a point of contact of the tooth and the rest pallet.

* * * * *